US012719577B2

(12) United States Patent
Xiao et al.

(10) Patent No.: US 12,719,577 B2
(45) Date of Patent: Aug. 25, 2026

(54) HIGH-ISOLATION LIGHT SOURCE FILLING DEVICE AND METHOD IN WAVELENGTH DIVISION MULTIPLEXING SYSTEM

(71) Applicant: Accelink Technologies Co., Ltd., Wuhan (CN)

(72) Inventors: Li Xiao, Wuhan (CN); Shujuan Sun, Wuhan (CN); Jiekui Yu, Wuhan (CN); Jian Xu, Wuhan (CN); Wen Chen, Wuhan (CN); Zhiyuan Wei, Wuhan (CN); Qi Li, Wuhan (CN); Xu Gao, Wuhan (CN)

(73) Assignee: Accelink Technologies Co., Ltd., Wuhan City (CN)

( * ) Notice: Subject to any disclaimer, the term of this patent is extended or adjusted under 35 U.S.C. 154(b) by 260 days.

(21) Appl. No.: 18/713,570

(22) PCT Filed: Nov. 24, 2022

(86) PCT No.: PCT/CN2022/133998
§ 371 (c)(1),
(2) Date: May 24, 2024

(87) PCT Pub. No.: WO2023/098556
PCT Pub. Date: Jun. 8, 2023

(65) Prior Publication Data

US 2025/0015895 A1 Jan. 9, 2025

(30) Foreign Application Priority Data

Dec. 3, 2021 (CN) ........................ 202111470844.9

(51) Int. Cl.
*H04B 10/25* (2013.01)
*H04J 14/02* (2006.01)

(52) U.S. Cl.
CPC ........ *H04B 10/25891* (2020.05); *H04J 14/02* (2013.01); *H04J 14/0202* (2013.01)

(58) Field of Classification Search
CPC ..................................................... H04J 14/0202
(Continued)

(56) References Cited

U.S. PATENT DOCUMENTS 6,522,803 B1 * 2/2003 Nakajima .......... H04Q 11/0005 385/24
10,218,454 B2 * 2/2019 Dangui ............. H04B 10/2916
(Continued)

FOREIGN PATENT DOCUMENTS

CN 101667879 A 3/2010
CN 104104463 A 10/2014
(Continued)

OTHER PUBLICATIONS

International Search Report for PCT/CN2022/133998 dated Jan. 17, 2023.

(Continued)

*Primary Examiner* — Kenneth N Vanderpuye
*Assistant Examiner* — Paul Morgan Brock
(74) *Attorney, Agent, or Firm* — Lei Fang, Esq.; Smith Tempel Blaha LLC

(57) ABSTRACT

This disclosure relates to the field of optical communication technology and provides a high-isolation light source filling device in a wavelength division multiplexing system and method thereof. The light source filling device comprises a multiplexing WSS and demultiplexing WSS, wherein a filling light source is arranged on an output port carrying no service, of the demultiplexing WSS, and the filling light source guides filling light into the output port carrying no service; the filling light is transmitted through a second common port of the demultiplexing WSS or a light splitting (Continued)

device arranged on a first common port of the demultiplexing WSS, and the filling light transmitted through the demultiplexing WSS is guided into an input port carrying no service, of the multiplexing WSS. In this disclosure, it achieves the filling of high-isolation wide-spectrum noise light, and on the other hand, it does not add additional filtering devices.

16 Claims, 6 Drawing Sheets

(58) Field of Classification Search
USPC ....................................... 398/43, 83, 192, 79
See application file for complete search history.

(56) References Cited

U.S. PATENT DOCUMENTS

2012/0087658 A1* 4/2012 Jander ................ H04Q 11/0005 398/48
2012/0201536 A1 8/2012 Liu et al.
2015/0155964 A1 6/2015 Han et al.
2018/0262292 A1 9/2018 Dangui et al.
2018/0287698 A1 10/2018 Oda
2019/0342028 A1 11/2019 He et al.
2020/0076501 A1 3/2020 Searcy et al.
2020/0092027 A1 3/2020 Yu et al.
2021/0328671 A1 10/2021 Xiao et al.
2023/0299867 A1 9/2023 Xiao et al.

FOREIGN PATENT DOCUMENTS

CN 109067463 A 12/2018
CN 109088777 A 12/2018
CN 210518357 U 5/2020
CN 112019262 A 12/2020
CN 113300771 A 8/2021
CN 113452434 A 9/2021
CN 114172613 A 3/2022
EP 3051719 A1 8/2016
EP 3098988 A1 11/2016
JP 2018182667 A 11/2018
JP 2018191109 A 11/2018
WO 2018065327 A1 4/2018

OTHER PUBLICATIONS

International Written Opinion for PCT/CN2022/133998 dated Jan. 17, 2023.
Search Report for CN Priority App No. 2021114708449 dated Apr. 24, 2023.

* cited by examiner

Figure 11

HIGH-ISOLATION LIGHT SOURCE FILLING DEVICE AND METHOD IN WAVELENGTH DIVISION MULTIPLEXING SYSTEM

CROSS-REFERENCE

This application is a 371 U.S. National Phase of PCT International Application No. PCT/CN2022/133998 filed on Nov. 24, 2022, which claims a benefit of, and priority to Chinese Patent Application No. 202111470844.9 filed on Dec. 3, 2021, the disclosure of each of which is hereby expressly incorporated by reference herein in its entirety.

TECHNICAL FIELD OF THE DISCLOSURE

This disclosure relates to the technical field of optical communication, particularly to a high-isolation light source filling device and method in a wavelength division multiplexing system.

BACKGROUND

In a wavelength Division multiplexing (WDM) optical transmission system, in order to ensure the stability of basic operating state of the transmission system during both full and non full configuration, generally a wide-spectrum noise light source is added to a channel carrying no service during non-full configuration. The power density of wide-spectrum noise light source is uniformly distributed at various frequencies to be capable of filling the wide-spectrum noise light source in any frequency range without any service. An Reconfigurable Optical Add-Drop Multiplexer (ROADM) based on a Wavelength-Selective Switch (WSS) is a key implementation for wavelength level service automatic scheduling in WDM optical transmission systems. The WSS has flexible wavelength scheduling capability. On the combining side of the WSS, different frequency ranges can be allocated to different uplink ports, thereby merging light from different uplink ports with corresponding frequencies to a common port. When a wide-spectrum noise light source is added to a certain uplink port of the multiplexing WSS, a controller allocates a frequency range that needs to be filled in this port, then after the wide-spectrum noise light is secondly filtered by the multiplexing WSS, it is highly isolated and is merged with the service channel for the filling noise light falling in a frequency range that does not need to fill, and it is blocked for the noise light in the frequency range of the configured service. However, due to the current low isolation of WSS ports in the industry, the isolation of noise light in the frequency range of configured services through a single WSS is too low, resulting in crosstalk noise from wide-spectrum noise sources on the service channel and deteriorating transmission performance. In order to improve the isolation of wide-spectrum noise light, it is often necessary to use multi-stage WSSs connected in series to achieve high-isolation and filling of wide-spectrum noise light source.

In view of this, it is an urgent problem to overcome the shortcomings of the existing technology in this technical field.

SUMMARY

The technical problem to be solved by this disclosure is that in the existing technologies, in the system of using multiplexing WSS to fill wide-spectrum noise light, it is not enough for the use of single-stage multiplexing WSS filtering to have enough optical isolation in the service channel frequency ranges of the wide-spectrum noise light source, and it is too high for the cost of using additional filtering devices to cascade to filtering.

The following technical solutions are adopted in this disclosure.

In a first aspect, the present disclosure provides a high-isolation light source filling device in a wavelength division multiplexing system, comprising a multiplexing WSS and a demultiplexing WSS, wherein a filling light source is arranged on an output port carrying no service, of the demultiplexing WSS, and the filling light source guides filling light into the output port carrying no service;

the filling light is transmitted through a second common port of the demultiplexing WSS or a light splitting device arranged on a first common port of the demultiplexing WSS, and then is guided into an input port carrying no service, of the multiplexing WSS.

In an embodiment of the present disclosure, the multiplexing WSS is used to transmit multiple uplink port channels outward through a common port of the multiplexing WSS:

the demultiplexing WSS is used to transmit multiple channels in current optical fibers inward through the first common port of the demultiplexing WSS and allocate into multiple output ports to complete channel reception.

In an embodiment of the present disclosure, an optical amplifier is further arranged on the input port carrying no service and is used to amplify the filling light transmitted through the demultiplexing WSS and then guide it into the input port carrying no service, of the multiplexing WSS.

In an embodiment of the present disclosure, an optical isolator is further arranged between the output port carrying no service, of the demultiplexing WSS and the filling light source, to prevent noise light within a filling light frequency range and from an opposite end from affecting the filling light source.

In an embodiment of the present disclosure, the light splitting device is specifically an optical ring resonator, or an optical coupler.

In an embodiment of the present disclosure, a first input/output port of the optical ring resonator is coupled with the first common port of the demultiplexing WSS, and the filling light transmitted through the demultiplexing WSS is guided into the input port carrying no service, of the demultiplexing WSS through a second output port of the optical ring resonator; a third input port of the optical ring resonator is used to guide received channel light into the demultiplexing WSS through the first input/output port;

The optical coupler comprises a main waveguide for guiding the received channel light into the demultiplexing WSS, and further comprises an assistant waveguide for transmitting the filling light transmitted in the main waveguide to the assistant waveguide and guiding it into the input port carrying no service, of the multiplexing WSS which is coupled with the assistant waveguide.

In an embodiment of the present disclosure, the filling light source is specifically a wide-spectrum noise light source.

In an embodiment of the present disclosure, the high-isolation light source filling device further comprises a controller, wherein the controller allocates several service channel frequencies to ports 1 to n−1 of the multiplexing WSS, wherein the controller allocates a frequency range that needs to be filled, and controls the wide-spectrum noise light source to guide the wide-spectrum noise light into a nth port of the multiplexing WSS after first filtered and transmitted via the demultiplexing WSS, wherein the nth port of the multiplexing WSS is an input port carrying no service; and the wide-spectrum noise light is second filtered by the multiplexing WSS, achieving high-isolation for the filled noise light in the frequency range that does not need to be filled.

In a second respect, the present disclosure provides a high-isolation light source filling method in a wavelength division multiplexing system, comprising:

determining an output port carrying no service, of a demultiplexing WSS during operating, and allocating a filling light source to the output port carrying no service;

connecting a light splitting device onto a first common port of the demultiplexing WSS in series, wherein the light splitting device makes the demultiplexing WSS receive optical signals carrying services, and demultiplexes filling light output from the first common port of the demultiplexing WSS; and coupling a demultiplexing port of the light splitting device to an input port carrying no service, of a multiplexing WSS, through an optical fiber or waveguide.

In an embodiment of the present disclosure, the light splitting device is specifically an optical ring resonator, or an optical coupler; and a first input/output port of the optical ring resonator is coupled with the first common port of the demultiplexing WSS, and the filling light transmitted through the demultiplexing WSS is guided into the input port carrying no service, of the multiplexing WSS, through a second output port of the optical ring resonator: a third input port of the optical ring resonator is used to guide received channel light into the demultiplexing WSS through the first input/output port;

the optical coupler comprises a main waveguide for guiding the received channel light into the demultiplexing WSS, and the optical coupler further comprises an assistant waveguide for transmitting the filling light transmitted in the main waveguide to the assistant waveguide itself and guiding it into the input port carrying no service, of the multiplexing WSS, which is coupled with the assistant waveguide.

This disclosure utilizes an idle port of the demultiplexing WSS to perform initial filtering on a wide-spectrum noise light source in a reverse direction, then increases the optical power through a wide-spectrum optical amplifier, and then injects it into a corresponding port of the multiplexing WSS for filling. Due to the initial filtering of the demultiplexing WSS, the noise spectrum of the service channel that does not need to be filled has been filtered and attenuated, and after it passes through the amplifier, the noise power that needs to be filled is increased. Then, through the multiplexing WSS, the filtered wide-spectrum noise filling light is combined with the service channel, achieving high-isolation without the need for an additional WSS or filter. On the one hand, this disclosure achieves the filling of high-isolation wide-spectrum noise light, and on the other hand, it does not need any additional filtering devices.

BRIEF DESCRIPTION OF THE DRAWINGS

In order to provide a clearer explanation of the technical solution of the disclosed embodiments, a brief introduction will be given below to the accompanying drawings required in the disclosed embodiments. Obviously, the accompanying drawings described below are only some embodiments disclosed herein. For those skilled in the art, other drawings can be obtained based on these drawings without paying any creative labor.

FIG. 11 is a schematic architecture diagram of an implementation method for a wavelength division multiplexing system provided in an embodiment of the present disclosure.

DETAILED DESCRIPTION

In order to make the purposes, technical solutions, and advantages of this disclosure clearer and more obvious, a further detailed explanation is provided in this disclosure in conjunction with the accompanying drawings and embodiments as follows. It should be understood that the specific embodiments described here are only intended to explain this disclosure and are not intended to limit it.

In the description disclosed herein, the terms “inward”, “outward”, “vertical”, “horizontal”, “up”, “down”, “top”, “bottom”, etc. indicate orientation or positional relationships based on the orientation or positional relationships shown in the accompanying drawings, these are only for the convenience of describing the present disclosure and do not require the disclosure to be constructed and operated in a specific orientation. Therefore, these should not be understood as a limitation on the present disclosure.

Before elaborating on the specific implementation plan of this disclosure, a detailed analysis of the existing technical problems will be conducted in conjunction with the accompanying drawings.

Figure 1:
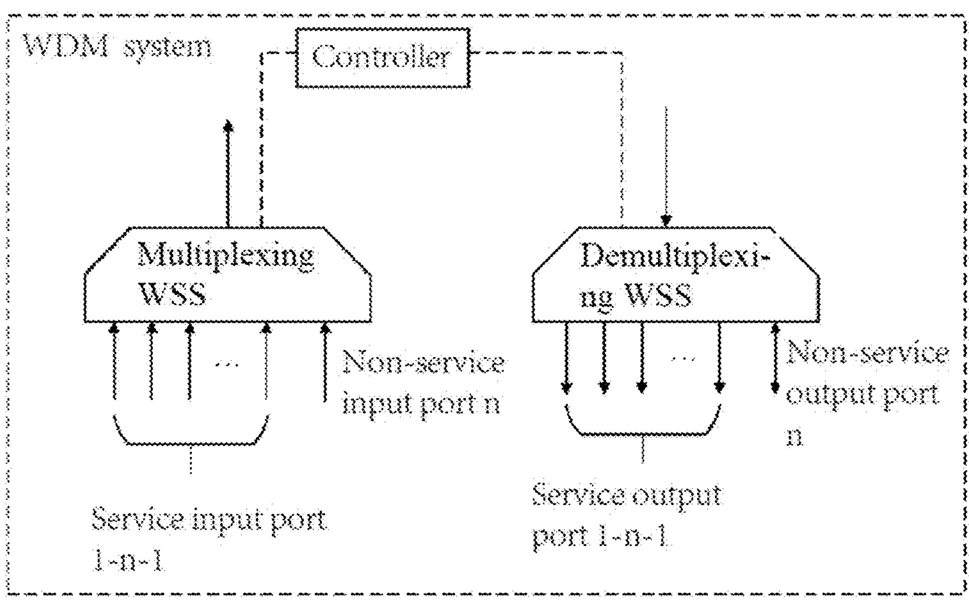
FIG. 1 is a schematic architecture diagram of a wavelength division multiplexing system in prior art.

A typical wide-spectrum noise light source covers the entire operating frequency range of a WDM system with a uniform optical power density to cover an operating frequency range of a multiplexing WSS, and completes power filling for any frequency range. As shown in FIG. 1, the multiplexing WSS has n ports which are used to connect various of channel optical signals. The $1^{st}$ to (n−1)th ports are all input ports for carrying services, while the nth port is not used for carrying services, but as a broadband filling light access port. It should be noted that in an embodiment of the present disclosure, the description of the corresponding input and output is more frequently determined by a propagation direction of the optical signal relative to the described subject itself. For example, in this case, for a multiplexing WSS, the propagation direction of the optical signal from the $1^{st}$ port to the (n−1)th port is from the outside to the inside of itself. Therefore, the description regarding its port is mainly in focused on the form of input, i.e., it is described as an input port for carrying services, or simply referred to as a service input port. Within the entire operating frequency range of the wavelength division multiplexing WDM system, a controller allocates several service channel frequencies at the $1^{st}$ to (n−1)th ports of the multiplexing WSS, and allocates the wide-spectrum noise frequency having service channels at the nth port of the multiplexing WSS. The wide-spectrum noise light source connected to the nth port of the multiplexing WSS covers the entire operating frequency range of the WDM system with a uniform optical power density. Due to the limited isolation degree of the multiplexing WSS port, the service channels configured at the $1^{st}$ to (n−1)th ports of the multiplexing WSS will be superimposed with a portion of unisolated noise from the nth port of the multiplexing WSS. The service channel existing in the uplink fiber after multiplexing with the multiplexing WSS results in a degradation of the Optical Signal Noise Ratio (OSNR) compared to the service connecting the 1st to (n−1)th ports of the multiplexing WSS.

Figure 2:
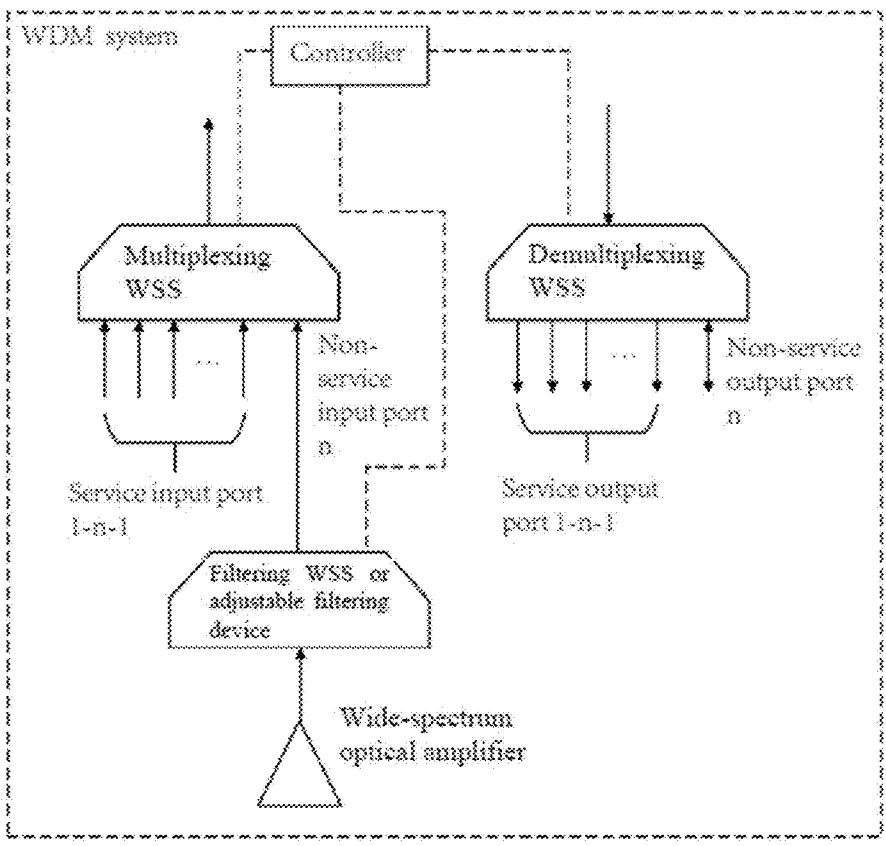
FIG. 2 is a schematic architecture diagram of an improved wavelength division multiplexing system in prior art.

In the prior art, in order to reduce the impact of the limited isolation degree of the multiplexing WSS on the OSNR of the service channel in the uplink fiber, as shown in FIG. 2, an additional filtering WSS or adjustable filtering device can be set to perform initial filtering on the wide-spectrum noise light source, thereby first suppressing the wide-spectrum noise light source in the corresponding frequency range of the service channel allocated at the 1st to (n−1)th ports of the multiplexing WSS, and then connecting to the nth port of the multiplexing WSS. After multiple filtering the wide-spectrum noise source, the crosstalk effect of the wide-spectrum noise source on the service light in the fiber is sufficiently small to avoid significant degradation of OSNR. But the additional adjustable filtering device needs additional components, resulting in increased costs and control complexity.

After studying the existing problems in the prior art and corresponding solutions mentioned above, not only did we understand one of the existing solutions, but also we analyzed the shortcomings of the solution itself. On this basis, through more in-depth research, another innovative alternative solution has been found, which reflects the outstanding ingenuity of the technical solution. Through research, it has been found that wavelength division multiplexing systems (also directly described as WSS devices in some scenarios) often appear in pairs, i.e. a pair of WSSs, wherein one of the WSSs serves as a multiplexing WSS, which realizes that after the transmission of multiple uplink port channels through the multiplexing WSS, finally the multiple uplink port channels are transmitted to the network through an uplink fiber of common port of the multiplexing WSS; while the other one serves as a demultiplexing WSS, which realizes that multiple channels (i.e. signal light from multiple central frequency bands) contained in a fiber optic are decoupled into multiple output ports of the demultiplexing WSS through the common port of the demultiplexing WSS, for devices located at the backend of the demultiplexing WSS to read and process optical signals from different channels. In a scenario studied in this application, it is also demonstrated that a pair of WSS has the same number of multiplexing and demultiplexing WSS ports, and the channel allocation schemes for the uplink and downlink are the same. Generally, the nth uplink port of the multiplexing WSS is connected as a wide-spectrum noise source, while the nth downlink port of the demultiplexing WSS is idle.

It is only after conducting the above-mentioned characteristic research that a more streamlined and highly reusable solution for existing devices is proposed in this disclosure.

In addition, the technical features involved in the various embodiments of the present disclosure described below can be combined with each other as long as they do not conflict with each other.

Embodiment 1

Figure 3:
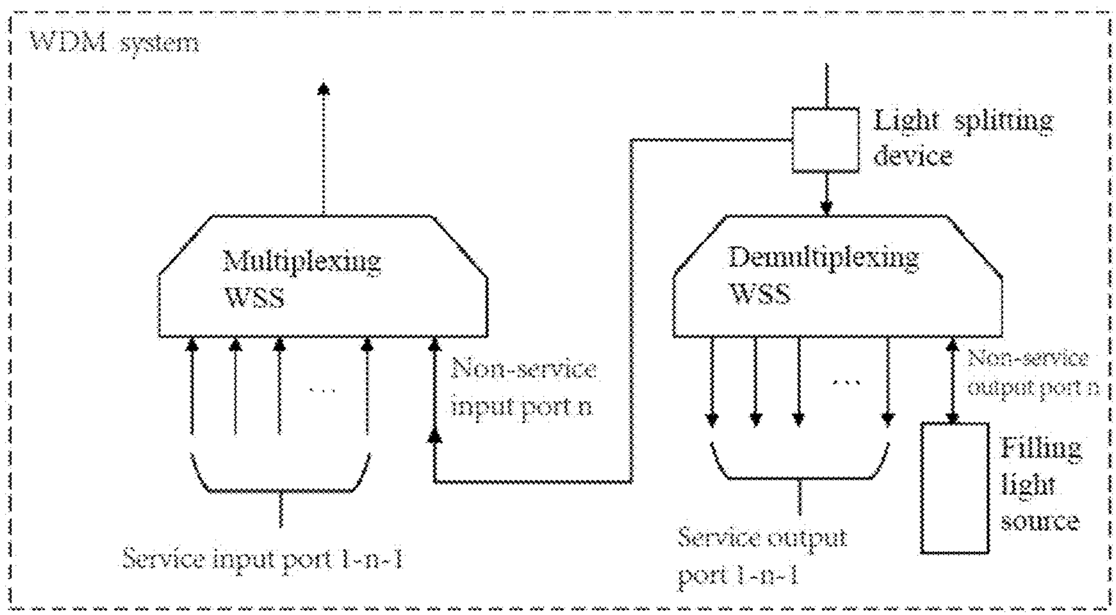
FIG. 3 is a schematic architecture diagram of a wavelength division multiplexing system provided in an embodiment of the present disclosure.

Embodiment 1 of the present disclosure provides a high-isolation light source filling device in a wavelength division multiplexing system, as shown in FIG. 3, comprising a multiplexing WSS and a demultiplexing WSS. The reason that the description of the controller is not involved here lies in that the solution proposed in the present disclosure is applicable to a range of scenarios also including a similar multiplexing WSS and demultiplexing WSS applied to a predetermined scenario. At this time, there is no need for controllers specifically designed for the control of multiplexing WSS and demultiplexing WSS as presented in the above analysis. It should also be noted that FIG. 3 does not visually demonstrate the structure in the following implementation scheme in which the filling light is transmitted through the second common port of the demultiplexing WSS and then guided into the input port carrying no service, of the demultiplexing WSS (the corresponding drawings associated with this scheme will be presented in the subsequent expansion of this disclosed embodiment); instead, a more common and widely applicable solution was presented by taking the filling light guiding it into the input port carrying service, of the multiplexing WSS through a light splitting device arranged on the first common port of the demultiplexing WSS. Therefore, in the high-isolation light source filling device in the wavelength division multiplexing system proposed in this disclosed embodiment, specifically,

- a filling light source is arranged on an output port carrying no service, of the demultiplexing WSS, and the filling light source guides filling light into the output port carrying no service;
- among the various implementation schemes disclosed herein, the most typical manifestation of the filling light is a wide-spectrum noise light source, wherein the wide-spectrum noise light source covers the entire operating frequency range of the WDM system with a uniform optical power density.

The filling light is transmitted through a second common port of the demultiplexing WSS or a light splitting device arranged on the first common port of the demultiplexing WSS, and is guided into an input port of the multiplexing WSS that does not carry any services.

As a scenario characteristic implemented in this disclosed embodiment, the multiplexing WSS and the demultiplexing WSS still follow the existing functional definitions. Specifically, the multiplexing WSS is used to achieve the transmission of multiple uplink port channels through a common port of the multiplexing WSS; and the demultiplexing WSS is used to achieve the transmission of multiple channels in the current optical fiber through a first common port of the demultiplexing WSS, and to be divided into multiple output ports to complete channel reception.

Embodiments of the disclosure utilizes an idle port of the demultiplexing WSS to perform initial filtering on a wide-spectrum noise light source in a reverse direction, then increases the optical power by using a broadband optical amplifier and injects it into the corresponding port of the multiplexing WSS for filling. Due to the initial filtering of the demultiplexing WSS, the noise spectrum of the service channel that does not need to be filled has been filtered and attenuated. After the service channel passes through the amplifier, the noise power that needs to be filled is increased. Then, through the multiplexing WSS, the filtered wide-spectrum noise is filled with light and combined with the service channel, thereby achieving high-isolation without the need for additional WSS or filters. In an embodiment of the disclosure, on the one hand, it achieves the filling of high-isolation wide-spectrum noise light, and on the other hand, it does not add any additional filtering devices.

Figure 4:
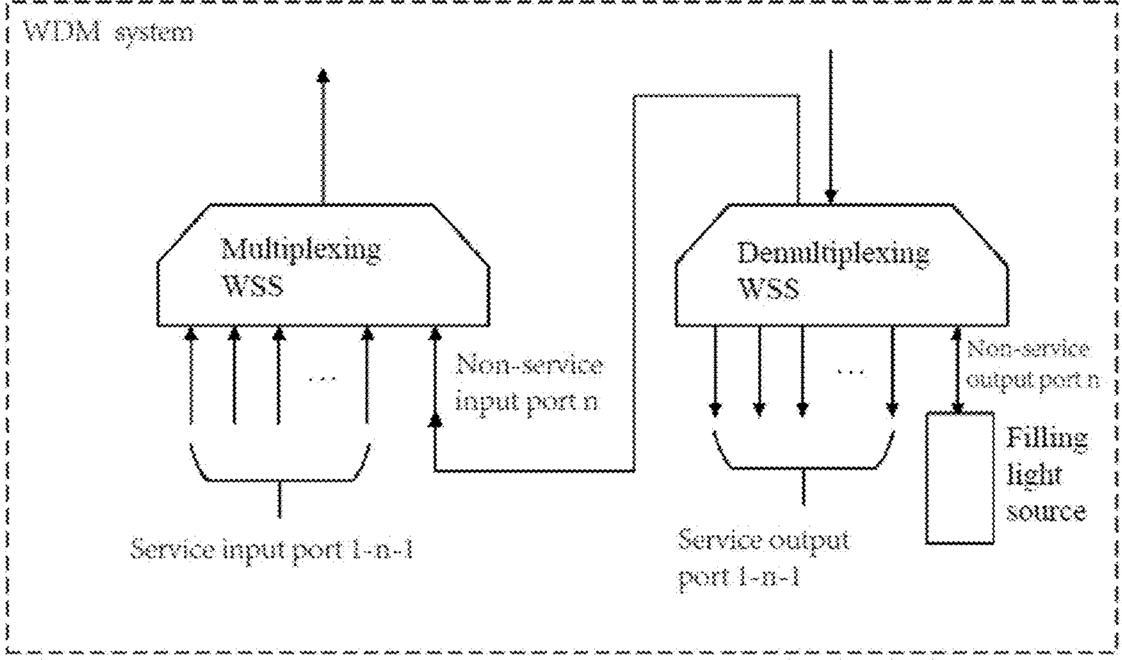
FIG. 4 is a schematic architecture diagram of a wavelength division multiplexing system provided in an embodiment of the present disclosure.

As shown in FIG. 4, it is an architecture implementation diagram that the filling light passes through the second common port of the demultiplexing WSS and the filling light transmitted through the demultiplexing WSS is guided into the input port of the multiplexing WSS carrying no service. This scheme is less frequently found than the architecture scheme shown in FIG. 3, as typically only one common port is set in the demultiplexing WSS, and rarely, as shown in FIG. 4, a second common port is provided for optical coupling with the non-service input port n of the multiplexing WSS. However, the reason that it is also proposed lies in that the technical solution proposed in this disclosure does not exclude such application scenarios, under which circumstance, as shown in FIG. 4, the second common port is exclusively used for transmitting the filling light source. In order to avoid redundancy in the relevant extension schemes brought in by the accompanying drawings of the specification, the following extension implementation schemes will be based on the architecture presented in FIG. 3, rather than separately extending the architecture shown in FIG. 4. However, for those skilled in the art, after knowing about the former extension scheme, relevant extension schemes can be applied to the architecture shown in FIG. 4 without any creative labor. Therefore, the corresponding derived solutions should also fall within the scope of protection of the embodiments of the present disclosure.

Before proceeding with the subsequent content, it is necessary to provide an explanation. In order to ensure consistency and clarity in the subsequent description, the methods described in the extended examples are all based on the nth port of the multiplexing WSS as the input port for non-service carrier, while the nth port of the demultiplexing WSS is described as the output port for non-service carrier. However, as a practical and feasible technical solution, the corresponding port does not necessarily have to be selected as the nth port. Therefore, the relevant description should not be used as a constraint limiting the port selection range in this disclosure.

Compared with prior technologies, the biggest innovation achieved by this disclosure lies in discovering a hidden operating mode of existing wavelength division multiplexing systems in the service scenario proposed in the embodiments of this disclosure, which can ensure the filtering of the corresponding signal frequency band contained in the filling light output by a wide-spectrum noise light source without adding a filtering WSS or adjustable filtering device as shown in FIG. 2, the corresponding signal light frequency band is represented as a frequency band of the signal light corresponding to the first port to the (n−1)th port which carry the service output.

One of the possible problems encountered during the implementation of an architecture similar to that shown in FIG. 3 in the embodiment of the disclosure is that when the corresponding filling light is coupled with the output port n of the demultiplexing WSS, transmitted internally by the demultiplexing WSS, and then split by the light splitting device, as well as transmitted through optical fibers or waveguides, and reaches the input port n for the non-service carrier, of the multiplexing WSS, its power cannot meet its own functional requirements. At this point, as an improved solution in this scenario, there is still one more improvement in combination with the disclosed embodiment. In this case, as shown in FIG. 5, the input port carrying no service is also provided with an optical amplifier (directly shown in FIG. 5 as a broadband optical amplifier used in conjunction with the corresponding wide-spectrum noise light source); the optical amplifier is used to amplify the filling light transmitted through the demultiplexing WSS and then guide it into the input port of the multiplexing WSS carrying no service.

Figure 5:
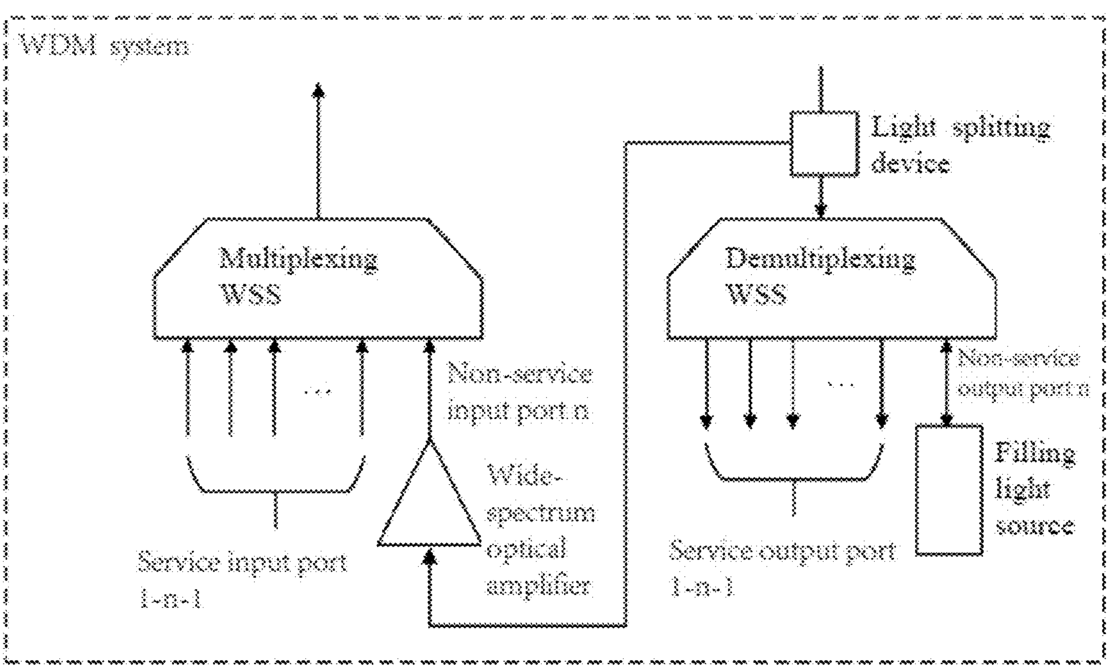
FIG. 5 is a schematic architecture diagram of a wavelength division multiplexing system provided in an embodiment of the present disclosure.
Figure 6:
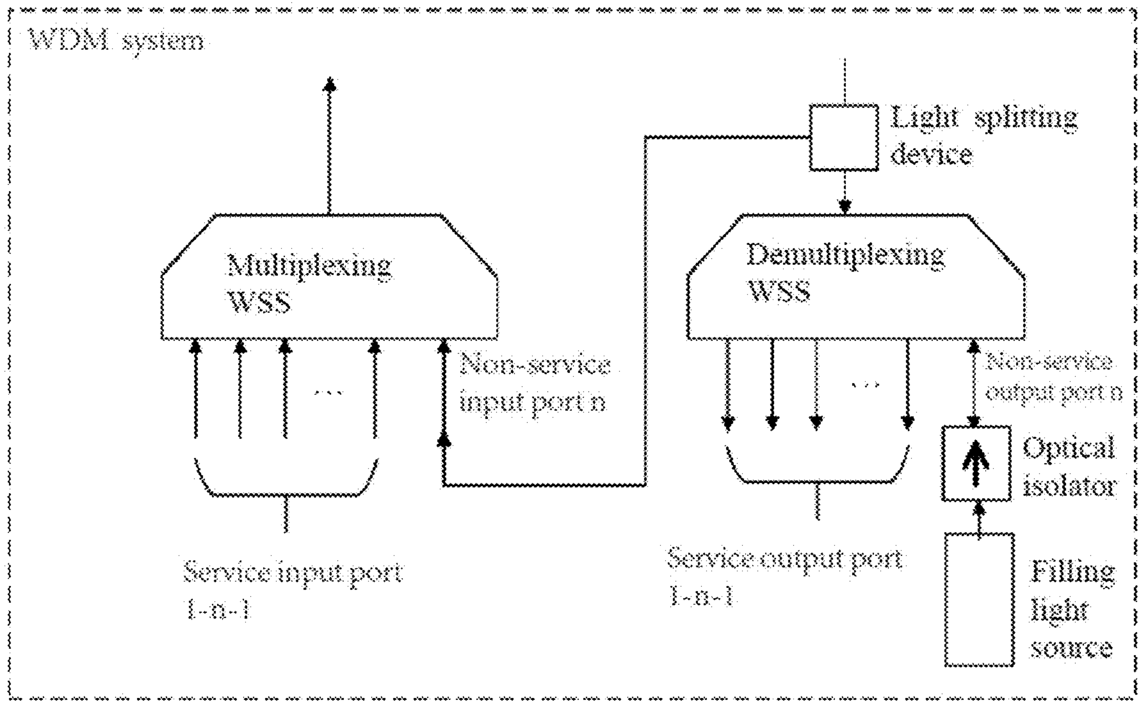
FIG. 6 is a schematic architecture diagram of a wavelength division multiplexing system provided in an embodiment of the present disclosure.

In an architecture similar to that shown in FIG. 3 or 5 in an embodiment of the present disclosure, considering that the ports of the demultiplexing WSS and the multiplexing WSS are symmetrical in terms of characteristics regarding service carrying transmission, for example, the signal light emitted by the first port of the multiplexing WSS is finally received by the demultiplexing WSS, namely received by its own first port: then the signal light emitted by the nth port of a similar multiplexing WSS is also received by its own nth port after being received by the demultiplexing WSS. In the examples listed in the present disclosure, the signal light emitted by the nth port of the corresponding multiplexing WSS is actually filling light (i.e. wide-spectrum noise light), which will bring about a problem that there will be both filling light received from the filling light source at the nth port of the demultiplexing WSS side, and the filling light from the opposite end multiplexing WSS, which is emitted from its nth port towards the filling light source after being demultiplexed by the demultiplexing WSS (its original source is still the filling light from the filling light source). In this way, external light injection will be formed for the filling light source, affecting its effectiveness in generating broad-spectrum noise light. This disclosure proposes an improved solution for this problem scenario, which can be applied to the architectures shown in FIGS. 3 and 5 respectively. Taking the scenario shown in FIG. 3 as an example, as shown in FIG. 6, an optical isolator is further set between the output port carrying no service, of the demultiplexing WSS and the filling light source to prevent noise light from the opposite end located within the filling light frequency range from affecting the filling light source.

Figure 7:
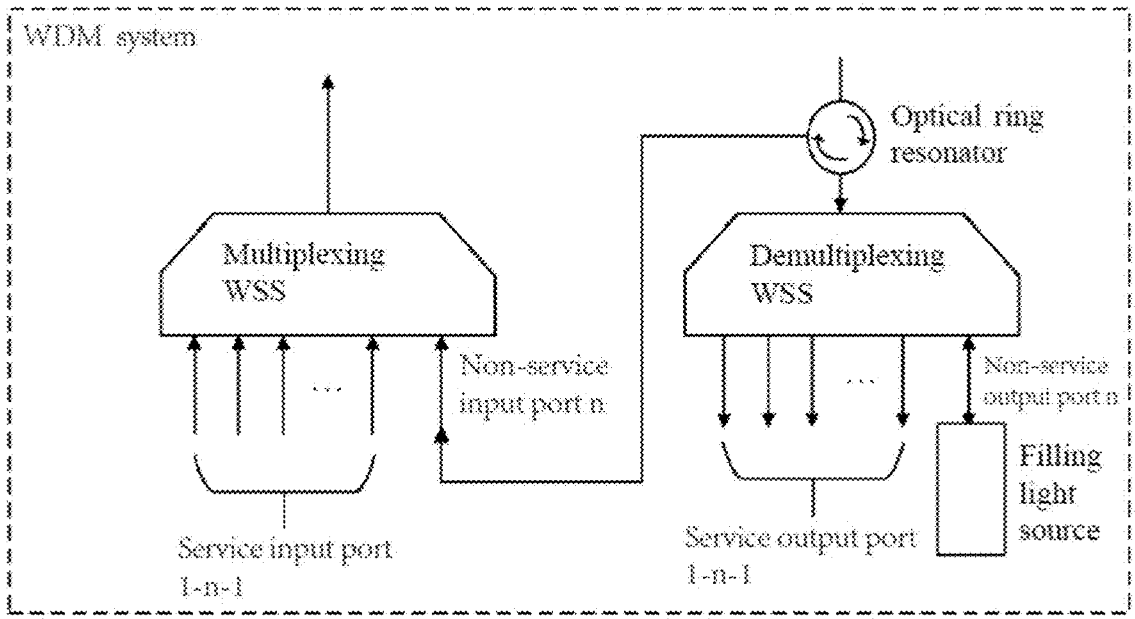
FIG. 7 is a schematic architecture diagram of a wavelength division multiplexing system provided in an embodiment of the present disclosure.
Figure 8:
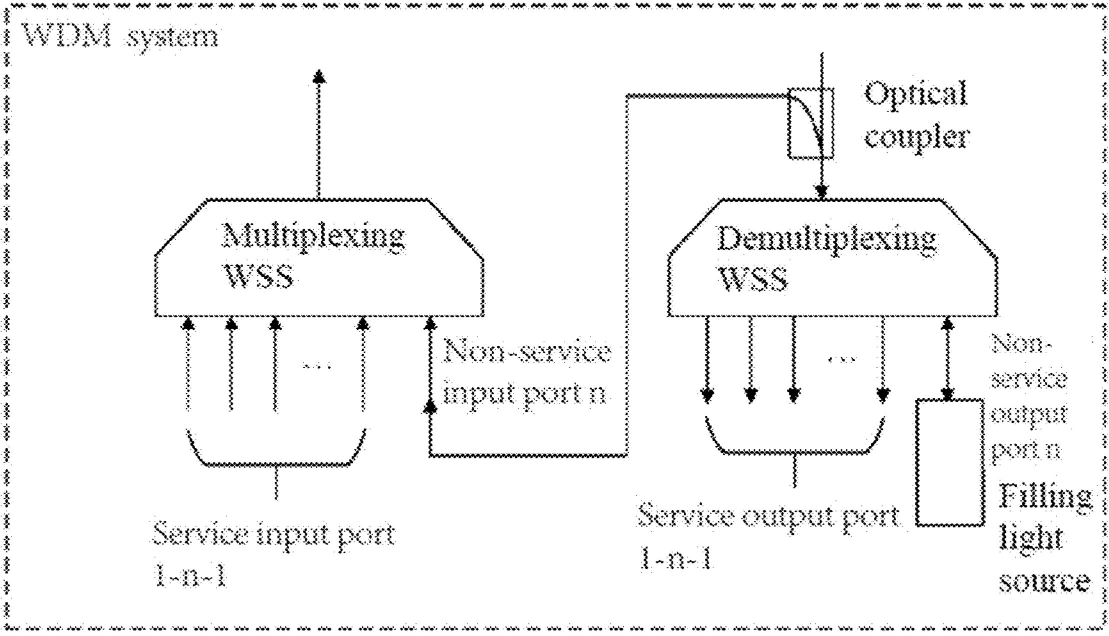
FIG. 8 is a schematic architecture diagram of a wavelength division multiplexing system provided in an embodiment of the present disclosure.

As shown in FIGS. 7 and 8, in an embodiment of the present disclosure, at least two implementation modes are provided for the light splitting device, such as an optical ring resonator shown in FIG. 7 or an optical coupler shown in FIG. 8.

In the implementation scheme of the corresponding optical ring resonator shown in FIG. 7 and combined with FIG. 3, the first input/output port of the optical ring resonator is coupled with the first common port of the demultiplexing WSS, and the filling light transmitted through the demultiplexing WSS is guided into the input port carrying no service, of the demultiplexing WSS through the second output port of the optical ring resonator: the third input port of the optical ring resonator is used to guide the received channel light into the demultiplexing WSS through the first input/output port. In this embodiment of the present disclosure, the optical ring resonator can also be combined in architectures similar to those shown in FIGS. 5 and 6, the contents of which will not repeated here.

Figure 9:
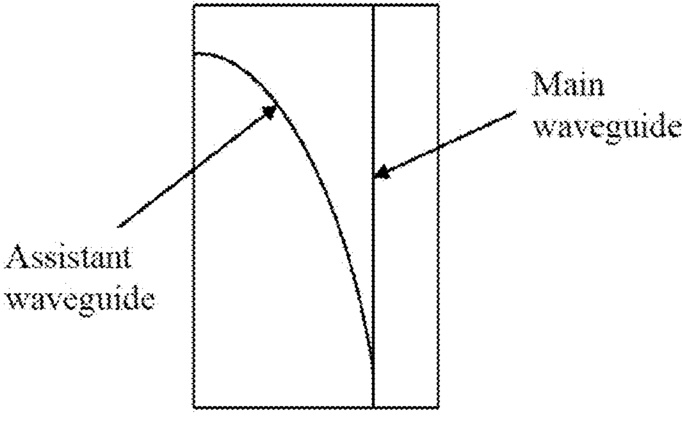
FIG. 9 is a schematic structure diagram of an optical coupler provided in an embodiment of the present disclosure.

In the implementation scheme of the corresponding optical coupler shown in FIG. 8 which is combined with FIG. 3, in combination with FIG. 9, the optical coupler comprises a main waveguide for guiding the received channel light into the demultiplexing WSS; and the optical coupler further includes an assistant waveguide for transmitting the filling light transmitted in the main waveguide to the assistant waveguide itself and guiding it into the input port of the multiplexing WSS which carries no service and is coupled with the assistant waveguide. In this embodiment of the present disclosure, the optical coupler can also be combined in architectures similar to those shown in FIGS. 5 and 6, the contents of which will not repeated here.

Figure 10:
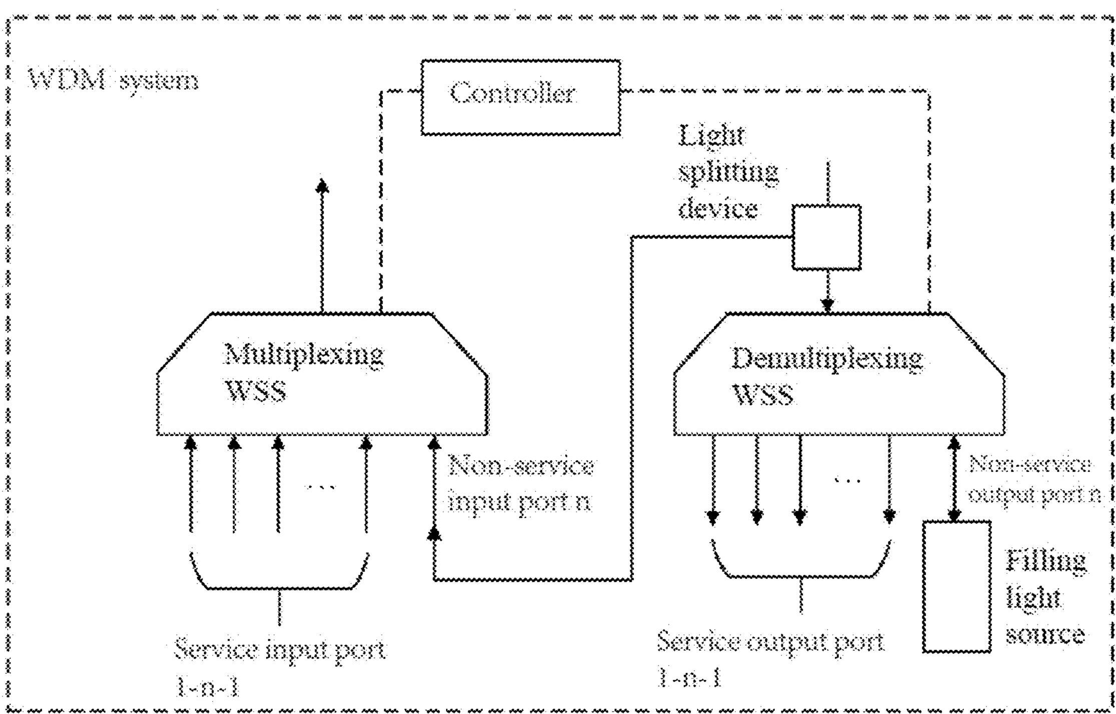
FIG. 10 is a schematic architecture diagram of a wavelength division multiplexing system provided in an embodiment of the present disclosure.

As an application scenario that is consistent with the existing technical scenarios guided in FIGS. 1 and 2, a controller can usually be included in the architecture shown in FIG. 3, which configures several service channel frequencies at the 1st to (n−1)th ports of the multiplexing WSS, as shown in FIG. 10 (in combination with the architecture presented in FIG. 3).

Specifically, the controller allocates a frequency range that needs to be filled, and controls the wide-spectrum noise light source to transmit the wide-spectrum noise light through the first filtering of the demultiplexing WSS and then guide into the nth port of the multiplexing WSS, wherein the nth port of the multiplexing WSS is an input port carrying no service; and after the second filtering of the multiplexing WSS, the wide-spectrum noise light achieves high-isolation for the filling noise light that does not need to be filled in the frequency range.

In optional implementation schemes, the controller can also be connected to a filling light source and/or a broadband optical amplifier, thereby providing control solutions in more aspects, so that the signal strength and spectral width of the broadband light entering the transmission network are more suitable for the scenario requirements.

Embodiment: 2

Figure 11:
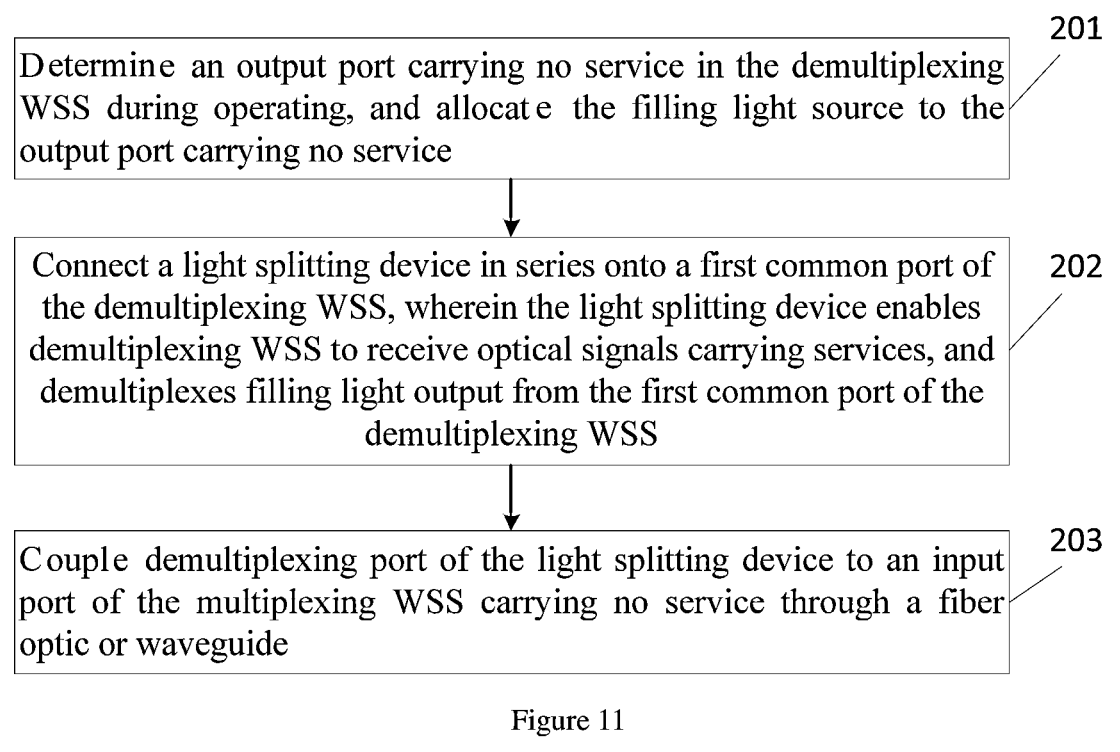

This embodiment of the disclosure also provides a high-isolation light source filling method in a wavelength division multiplexing system, which is useful for how to achieve the device architecture described in Embodiment 1, as shown in FIG. 11, the method comprising:

- Step 201, determining an output port carrying no service in the demultiplexing WSS during operating, and allocating the filling light source to the output port carrying no service.
- Step 202, connecting a light splitting device in series onto a first common port of the demultiplexing WSS, wherein the light splitting device enables demultiplexing WSS to receive optical signals carrying services, and demultiplexes filling light output from the first common port of the demultiplexing WSS.
- Step 203, coupling a demultiplexing port of the light splitting device to an input port of the multiplexing WSS carrying no service through a fiber optic or waveguide.

This embodiment of the present disclosure utilizes an idle port of the demultiplexing WSS to perform initial filtering on a wide-spectrum noise light source in a reverse direction, then increases the optical power through a broadband optical amplifier and injects it into the corresponding port of the multiplexing WSS for filling. Due to the initial filtering of the demultiplexing WSS, the noise spectrum of the service channel that does not need to be filled has been filtered and attenuated. After passing through the amplifier, the noise power that needs to be filled is increased. Then, through the multiplexing WSS, the filtered wide-spectrum noise is filled with light and combined with the service channel, achieving high-isolation without the need for additional WSS or filters. This disclosed embodiment, on the one hand, achieves the filling of high-isolation wide-spectrum noise light, and on the other hand, does not add additional filtering devices.

Combining with the embodiments of the present disclosure, it is also a reference to a structure to explain the method process of the disclosed embodiments among the many extended implementation methods in the embodiments. Therefore, through the following method process, other related extended implementation methods similar to embodiment 1 can also be implemented in the disclosed embodiments by referring to similar descriptions. Therefore, it will not be elaborated too much in the disclosed embodiments.

Next, the method content will be elaborated on using the light splitting device as an optical ring resonator or optical coupler.

A first input/output port of the optical ring resonator is coupled with the first common port of the demultiplexing WSS: the filling light transmitted through the demultiplexing WSS is guided into the input port of the multiplexing WSS without carrying services through a second output port of the optical ring resonator; and a third input port of the optical ring resonator is used to guide received channel light into the demultiplexing WSS through the first input/output port; and The optical coupler comprises a main waveguide for guiding the received channel light into the demultiplexing WSS, and the optical coupler further comprises an assistant waveguide for transmitting the filling light transmitted in the main waveguide to the assistant waveguide and guiding it into the input port of the multiplexing WSS carrying no service and coupled with the assistant waveguide.

It is noted that the information exchange, execution process, and other contents between the modules and units within the above-mentioned devices and systems are based on the same technical idea as the embodiments of the processing method in the present disclosure, thus the specific content thereof can be described in the embodiments of the disclosed method and will not be repeated here.

The above are only preferred embodiments of this disclosure and is not intended to limit this disclosure. Any modifications, equivalent substitutions, and improvements made within the spirit and principles of this disclosure shall be included within the scope of protection of this disclosure.

What is claimed is:

1. A high-isolation light source filling device in a wavelength division multiplexing system, comprising a multiplexing WSS and a demultiplexing WSS, wherein:

- a filling light source is arranged on an output port carrying no service, of the demultiplexing WSS, and the filling light source guides filling light into the output port carrying no service;
- the filling light is transmitted through a second common port of the demultiplexing WSS or a light splitting device arranged on a first common port of the demultiplexing WSS, and the filling light transmitted through the demultiplexing WSS is guided into an input port carrying no service, of the multiplexing WSS.

2. The high-isolation light source filling device in a wavelength division multiplexing system of claim 1, wherein the multiplexing WSS is used to transmit multiple uplink channel data corresponding to the multiple output ports carrying services through its own multiple output ports carrying services outward via a common port of the multiplexing WSS;

the demultiplexing WSS is used to transmit multiple downlink channel data in the current optical fiber inward through the first common port of the demultiplexing WSS, and further divide the multiple downlink channel data into multiple output ports of the demultiplexing WSS to complete reception of the downlink channel data.

3. The high-isolation light source filling device in the wavelength division multiplexing system of claim 1, wherein an optical amplifier is further arranged on the input port carrying no service, of the multiplexing WSS; and the optical amplifier is used to amplify the filling light filtered and transmitted by the demultiplexing WSS, and then guide it into the input port carrying no service, of the multiplexing WSS.

4. The high-isolation light source filling device in a wavelength division multiplexing system of claim 1, wherein an optical isolator is further arranged between the output port carrying no service, of the demultiplexing WSS and the filling light source, to prevent noise light within a frequency range of the filling light from an opposite end from being transmitted inward through the first common port of the demultiplexing WSS, output to the filling light source through the output port carrying no service, of the demultiplexing WSS, and affecting the filling light source.

5. The high-isolation light source filling device in a wavelength division multiplexing system of claim 1, wherein the light splitting device is specifically an optical ring resonator or an optical coupler.

6. The high-isolation light source filling device in a wavelength division multiplexing system of claim 5, wherein a first input/output port of the optical ring resonator is coupled with the first common port of the demultiplexing WSS, and the filling light transmitted through the demultiplexing WSS is guided into the input port carrying no service, of the multiplexing WSS, through a second output port of the optical ring resonator; a third input port of the optical ring resonator is used to guide the downlink channel data received from the opposite end into the demultiplexing WSS through the first input/output port; or the optical coupler comprises a main waveguide for guiding downlink channel data received from an opposite end into the demultiplexing WSS; and the optical coupler further comprises an assistant waveguide for transmitting the filling light transmitted in the main waveguide to the assistant waveguide and guiding it into the input port carrying no service, of the multiplexing WSS coupled with the assistant waveguide.

7. The high-isolation light source filling device in a wavelength division multiplexing system of claim 1, wherein the filling light source is specifically a wide-spectrum noise light source, wherein the wide-spectrum noise light source covers the entire operating frequency range of the WDM system with a uniform optical power density.

8. The high-isolation light source filling device in the wavelength division multiplexing system of claim 7, further comprising a controller, wherein the controller configures several service channel frequencies at ports 1 to n−1 of the multiplexing WSS, wherein the controller is configured a frequency range that needs to be filled, and by controlling the broad-spectrum noise light source, guides the broad-spectrum noise light into a nth port of the multiplexing WSS after the broad-spectrum noise light source is for a first time transmitted and filtered through the demultiplexing WSS, wherein the nth port of the multiplexing WSS is an input port carrying no service; and wherein the wide-spectrum noise light is filtered for a second time by the multiplexing WSS to achieve high-isolation for the filled noise light falling in a frequency range that does not need to be filled.

9. The high-isolation light source filling device in a wavelength division multiplexing system of claim 7, wherein the light splitting device is specifically an optical ring resonator or an optical coupler;

a first input/output port of the optical ring resonator is coupled with the first common port of the demultiplexing WSS, and the filling light transmitted through the demultiplexing WSS is guided into the input port carrying no service, of the multiplexing WSS through a second output port of the optical ring resonator; and a third input port of the optical ring resonator is used to guide the received channel light into the demultiplexing WSS through the first input/output port;

the optical coupler comprises a main waveguide for guiding the received channel light into the demultiplexing WSS; and the optical coupler further comprises an assistant waveguide for transmitting the filling light transmitted in the main waveguide to the assistant waveguide and guiding it into the input port carrying no service, of the multiplexing WSS coupled with the assistant waveguide.

10. The high-isolation light source filling device in a wavelength division multiplexing system of claim 2, wherein the light splitting device is specifically an optical ring resonator or an optical coupler.

11. The high-isolation light source filling device in a wavelength division multiplexing system of claim 3, wherein the light splitting device is specifically an optical ring resonator or an optical coupler.

12. The high-isolation light source filling device in a wavelength division multiplexing system of claim 4, wherein the light splitting device is specifically an optical ring resonator or an optical coupler.

13. The high-isolation light source filling device in a wavelength division multiplexing system of claim 2, wherein the filling light source is specifically a wide-spectrum noise light source, wherein the wide-spectrum noise light source covers the entire operating frequency range of the WDM system with a uniform optical power density.

14. The high-isolation light source filling device in a wavelength division multiplexing system of claim 3, wherein the filling light source is specifically a wide-spectrum noise light source, wherein the wide-spectrum noise light source covers the entire operating frequency range of the WDM system with a uniform optical power density.

15. The high-isolation light source filling device in a wavelength division multiplexing system of claim 4, wherein the filling light source is specifically a wide-spectrum noise light source, wherein the wide-spectrum noise light source covers the entire operating frequency range of the WDM system with a uniform optical power density.

16. A high-isolation light source filling method in a wavelength division multiplexing system, wherein the method comprises:

determining an output port carrying no service during operation in a demultiplexing WSS, and allocating a filling light source to the output port carrying no service;

connecting a light splitting device in series on a first common port of the demultiplexing WSS, wherein the light splitting device enables the demultiplexing WSS to receive optical signals carrying services, and demultiplexes filling light output from the first common port of the demultiplexing WSS;

coupling a demultiplexing port of the optical splitter to an input port carrying no service, of the multiplexing WSS, through an optical fiber or waveguide.

* * * * *